US009470568B2

United States Patent
Patten et al.

(10) Patent No.: US 9,470,568 B2
(45) Date of Patent: *Oct. 18, 2016

(54) DENSITY METER IN ELECTRICAL COMMUNICATION WITH A VOLUMETRIC FLOW METER AND BOTH IN ELECTRICAL COMMUNICATION WITH A METER ELECTRONICS THAT OUTPUTS A MASS FLOW MEASUREMENT

(75) Inventors: Andrew Timothy Patten, Boulder, CO (US); Ruth Galic-Mackall, Niwot, CO (US); Anna Pishchulina, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/381,106

(22) PCT Filed: Mar. 13, 2012

(86) PCT No.: PCT/US2012/028924
§ 371 (c)(1),
(2), (4) Date: Aug. 26, 2014

(87) PCT Pub. No.: WO2013/137866
PCT Pub. Date: Sep. 19, 2013

(65) Prior Publication Data
US 2015/0013474 A1  Jan. 15, 2015

(51) Int. Cl.
| | | |
|---|---|---|
| *G01F 1/84* | (2006.01) | |
| *G01F 7/00* | (2006.01) | |
| *G01N 9/00* | (2006.01) | |
| *G01F 1/86* | (2006.01) | |

(Continued)

(52) U.S. Cl.
CPC .............. *G01F 1/8436* (2013.01); *G01F 1/86* (2013.01); *G01F 1/90* (2013.01); *G01F 15/063* (2013.01)

(58) Field of Classification Search
None
See application file for complete search history.

(56) References Cited

U.S. PATENT DOCUMENTS

| | | | |
|---|---|---|---|
| 3,739,635 A | 6/1973 | Stuart | |
| 3,785,204 A | 1/1974 | Lisi | |
| 4,881,412 A * | 11/1989 | Northedge | .............. G01F 15/08 700/273 |

(Continued)

FOREIGN PATENT DOCUMENTS

| | | |
|---|---|---|
| CN | 1934428 A | 3/2007 |
| DE | 19633416 A1 | 3/1997 |

(Continued)

*Primary Examiner* — Harshad R Patel
(74) *Attorney, Agent, or Firm* — The Ollila Law Group LLC

(57) ABSTRACT

A mass flow rate sensor system (200) is provided. The mass flow rate sensor system (200) includes a density meter (202) including a sensor assembly (204a) and a density meter electronics (204b) configured to generate a density measurement of a process fluid. The mass flow rate sensor system (200) further includes a volumetric flow meter (203) including a sensor assembly (205a) and a volumetric meter electronics (205b) configured to generate a volumetric flow rate of the process fluid and in electrical communication with the density meter electronics (204b). A remote processing system (207) is provided that is in electrical communication with only one of the density meter electronics (204b) or the volumetric meter electronics (205b). The remote processing system (207) is configured to receive a mass flow rate measurement of the process fluid generated by the density meter electronics (204b) or the volumetric meter electronics (205b) based on the generated density measurement and the generated volumetric flow rate.

12 Claims, 4 Drawing Sheets

(51) Int. Cl.
*G01F 1/90* (2006.01)
*G01F 15/06* (2006.01)

(56) References Cited

U.S. PATENT DOCUMENTS

| | | | |
|---|---|---|---|
| 4,992,952 A * | 2/1991 | Sasaki | B05B 12/08 |
| | | | 118/696 |
| 5,687,100 A * | 11/1997 | Buttler | G01F 1/8413 |
| | | | 702/100 |
| 5,861,561 A * | 1/1999 | Van Cleve | G01F 1/8404 |
| | | | 73/202 |
| 6,360,579 B1 * | 3/2002 | De Boom | G01F 25/003 |
| | | | 73/1.35 |
| 6,484,590 B1 * | 11/2002 | Kleven | G01F 1/3254 |
| | | | 73/861.22 |
| 6,957,586 B2 | 10/2005 | Sprague | |
| 6,959,609 B2 * | 11/2005 | Stephenson | G01N 9/00 |
| | | | 73/197 |
| 7,028,528 B2 * | 4/2006 | Antonijevic | G01F 25/003 |
| | | | 73/1.16 |
| 7,272,512 B2 * | 9/2007 | Wang | G01F 1/6842 |
| | | | 702/100 |
| 7,363,800 B2 * | 4/2008 | Gysling | G01F 1/74 |
| | | | 702/23 |
| 7,434,479 B2 * | 10/2008 | Gulich | G01F 1/42 |
| | | | 73/861.52 |
| 7,600,417 B2 | 10/2009 | Paradise | |
| 7,793,555 B2 * | 9/2010 | Gysling | G01F 1/7082 |
| | | | 73/861.27 |
| 8,229,686 B2 * | 7/2012 | Rawat | G01F 1/708 |
| | | | 702/45 |
| 2004/0069290 A1 | 4/2004 | Bucktron et al. | |
| 2005/0061060 A1 * | 3/2005 | Gysling | G01F 1/74 |
| | | | 73/32 A |
| 2005/0061061 A1 * | 3/2005 | Stephenson | G01N 9/00 |
| | | | 73/32 R |
| 2006/0096388 A1 * | 5/2006 | Gysling | G01F 1/666 |
| | | | 73/861.03 |
| 2007/0151333 A1 | 7/2007 | Paradise | |
| 2009/0025472 A1 * | 1/2009 | Garvin | G01F 5/00 |
| | | | 73/202 |
| 2011/0264385 A1 * | 10/2011 | Weinstein | G01F 1/8436 |
| | | | 702/48 |
| 2012/0125124 A1 * | 5/2012 | Hays | G01F 1/8436 |
| | | | 73/861.357 |
| 2013/0197828 A1 * | 8/2013 | Paradise | G01F 1/90 |
| | | | 702/45 |
| 2015/0160056 A1 * | 6/2015 | Schollenberger | G01F 1/74 |
| | | | 73/861.357 |
| 2016/0084691 A1 * | 3/2016 | Wheeler | G01F 1/00 |
| | | | 73/861.357 |

FOREIGN PATENT DOCUMENTS

| | | |
|---|---|---|
| JP | 55-37907 | 3/1980 |
| JP | 2007-530951 | 10/2005 |
| WO | 2005095902 A1 | 10/2005 |
| WO | 2007036418 A1 | 4/2007 |
| WO | 2008025934 | 3/2008 |

* cited by examiner

DENSITY METER IN ELECTRICAL COMMUNICATION WITH A VOLUMETRIC FLOW METER AND BOTH IN ELECTRICAL COMMUNICATION WITH A METER ELECTRONICS THAT OUTPUTS A MASS FLOW MEASUREMENT

TECHNICAL FIELD

The embodiments described below relate to, combination mass flow sensor systems, and more particularly, to a density meter in electrical communication with a volumetric flow meter that outputs a mass flow measurement.

BACKGROUND OF THE INVENTION

Vibrating meters, such as Coriolis mass flow meters exist, which can measure a mass flow rate of a fluid directly. While Coriolis mass flow meters have received great success in a variety of industries, there are certain situations where Coriolis mass flow meters are undesirable. For example, in some situations, the cost of using high purity metals, such as tantalum or titanium, for the flow tubes becomes prohibitively expensive in high flow situations where the size of the tubes requires an excessive amount of the metal. Another situation may be where a customer already has either a density meter or a volumetric flow meter installed in their system and simply requires the other meter in order to generate a mass flow rate. In such situations, the customer may not wish to replace the existing sensor, but rather simply add the missing measurement device in order to calculate a mass flow rate using equation (1):

$$\dot{m} = Q*\rho \qquad (1)$$

Where:
$\dot{m}$ is the mass flow rate;
Q is the volumetric flow rate; and
$\rho$ is the density.

One problem with the combination of a density meter and a volumetric flow meter as opposed to a Coriolis mass flow meter in order to generate a mass flow rate is the excessive amount of wiring involved as shown in FIG. 1.

FIG. 1 shows a prior art mass flow sensor system 10. The prior art mass flow sensor system 10 can include a density meter 11 and a volumetric flow meter 12. The density meter 11 and the volumetric flow meter 12 are positioned within a flow conduit 5 carrying a process fluid. The density meter 11 may comprise any one of well-known density meters, such as a Coriolis density meter, a hygrometer, an x-ray densitometer, a gamma densitometer, etc. The volumetric flow meter 12 may comprise any well-known meter that measures a volumetric flow rate, such as an ultra-sonic meter, a magnetic meter, a turbine meter, a vortex meter, etc.

The prior art mass flow sensor system 10 also includes a central processing system 13. As shown, the density meter 11 is in electrical communication with the central processing system 13 via electrical leads 14. Similarly, the volumetric flow meter 12 is in electrical communication with the central processing system 13 via electrical leads 15. Therefore, each of the meters 11, 12 sends signals to the central processing system 13. The central processing system 13 processes the signals received from the density meter 11 to generate a density measurement. Likewise, the central processing system 13 processes the signals received from the volumetric flow meter 12 to generate a volumetric flow rate. The central processing system 13 may subsequently generate a mass flow rate based on the generated density and volumetric flow rate. The mass flow rate may then be provided to a user or another processing system via leads 16. As an alternative, the central processing system 13 may simply output the individual density and the volumetric flow rate without calculating a mass flow rate. The customer must then use another processing system to determine the mass flow rate based on the output from the central processing system 13.

The prior art mass flow system 10 suffers from a number of problems. One problem is due to the increased amount of wiring required. While the density meter 11 and the volumetric flow meter 12 are often located relatively close to one another, the central processing system 13 may be located remotely from the density meter 11 and the volumetric flow meter 12. Consequently, because each meter 11 and 12 communicates with the central processing system 13 independently, the amount of wiring is duplicative.

Another problem with the prior art system 10 is that if either the density meter 11 or the volumetric flow meter 12 needs to be replaced, the central processing system 13 needs to be reprogrammed to receive the new signals from the new meter. Often, the central processing system 13 may be a customer's own equipment and thus, the customer is required to perform the updated programming.

Similarly, many users simply want the mass flow rate and do not necessarily need to know the particular density or the volumetric flow rate. However, in the prior art system 10, the user is only provided signals indicating the density and the volumetric flow rate and is required to perform the calculation of the mass flow rate independently.

Therefore, there is a need in the art for a system that can provide a mass flow rate output using a density meter and a volumetric flow rate meter. Further, there is a need in the art for a system that can reduce the required wiring, especially between the meters and a central processing system. The embodiments described below overcome these and other problems and an advance in the art is achieved. The embodiments described below provide a mass flow rate system that uses one or both of the density meter and the volumetric flow rate meter to perform the mass flow calculation. Consequently, only one of the meters needs to be in communication with a central processing system. Therefore, the system outputs a mass flow rate and the wiring required to communicate with the central processing system is reduced.

SUMMARY OF THE INVENTION

A mass flow rate sensor system is provided according to an embodiment. The mass flow rate sensor system comprises a density meter including a sensor assembly and a density meter electronics configured to generate a density measurement of a process fluid. According to an embodiment, the mass flow rate sensor system further comprises a volumetric flow meter including a sensor assembly and a volumetric meter electronics configured to generate a volumetric flow rate of the process fluid and in electrical communication with the meter electronics of the density meter. According to an embodiment, the mass flow rate sensor system further comprises a remote processing system in electrical communication with only one of the density meter electronics or the volumetric meter electronics. The remote processing system is configured to receive a mass flow rate measurement of the process fluid generated by the density meter electronics or the volumetric meter electronics based on the generated density measurement and the generated volumetric flow rate.

A method for generating a mass flow rate measurement of a process fluid in a fluid conduit is provided according to an embodiment. The method comprises a step of determining a density of the process fluid with a density meter including a sensor assembly in fluid communication with the process fluid and a density meter electronics. According to an embodiment, the method further comprises a step of determining a volumetric flow rate of the process fluid with a volumetric flow meter including a sensor assembly in fluid communication with the process fluid and a volumetric meter electronics. According to an embodiment, electrical communication is provided between the density meter electronics and the volumetric meter electronics. The method further comprises a step of using at least one of the density meter electronics or the volumetric meter electronics to determine a mass flow rate of the process fluid based on the determined density and the determined volumetric flow rate. The method further comprises a step of providing the mass flow rate to a remote processing system in electrical communication with only one of the density meter electronics or the volumetric meter electronics.

ASPECTS

According to an aspect, a mass flow rate sensor system comprises:
a density meter including a sensor assembly and a density meter electronics configured to generate a density measurement of a process fluid;
a volumetric flow meter including a sensor assembly and a volumetric meter electronics configured to generate a volumetric flow rate of the process fluid and in electrical communication with the density meter electronics; and
a remote processing system in electrical communication with only one of the density meter electronics or the volumetric meter electronics and configured to receive a mass flow rate measurement of the process fluid generated by the density meter electronics or the volumetric meter electronics based on the generated density measurement and the generated volumetric flow rate.

Preferably, the sensor assembly of the density meter and the sensor assembly of the volumetric flow meter are located in line with a fluid conduit carrying the process fluid.

Preferably, the sensor assembly of the volumetric flow meter is located in line with a fluid conduit carrying the process fluid and the sensor assembly of the density meter is located in a slip stream coupled to the fluid conduit to receive a portion of the process fluid.

Preferably, the density measurement and the volumetric flow rate are generated substantially simultaneously.

Preferably, the density measurement comprises an average density.

According to another aspect, a method for generating a mass flow rate measurement of a process fluid in a fluid conduit comprises steps of:
determining a density of the process fluid with a density meter including a sensor assembly in fluid communication with the process fluid and a density meter electronics;
determining a volumetric flow rate of the process fluid with a volumetric flow meter including a sensor assembly in fluid communication with the process fluid and a volumetric meter electronics;
providing electrical communication between the density meter electronics and the volumetric meter electronics;
using at least one of the density meter electronics or the volumetric meter electronics to determine a mass flow rate of the process fluid based on the determined density and the determined volumetric flow rate; and
providing the mass flow rate to a remote processing system in electrical communication with only one of the density meter electronics or the volumetric meter electronics.

Preferably, the sensor assembly of the density meter and the sensor assembly of the volumetric flow meter are located in line with the fluid conduit carrying the process fluid.

Preferably, the sensor assembly of the volumetric flow meter is located in line with the fluid conduit carrying the process fluid and the sensor assembly of the density meter is located in a slip stream coupled to the fluid conduit to receive a portion of the process fluid.

Preferably, the density measurement and the volumetric flow rate are determined substantially simultaneously.

Preferably, the density measurement comprises an average density.

DETAILED DESCRIPTION OF THE INVENTION

Figure 2:
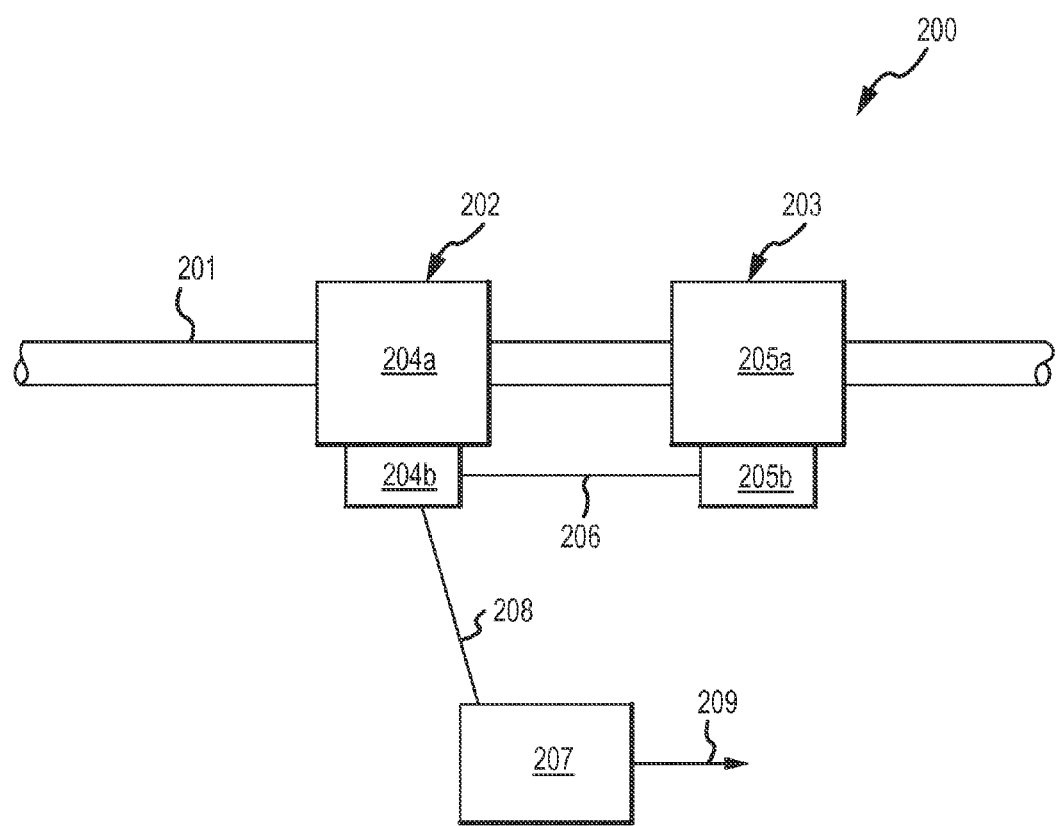
FIG. 2 shows a mass flow rate sensor system according to an embodiment.
Figure 3:
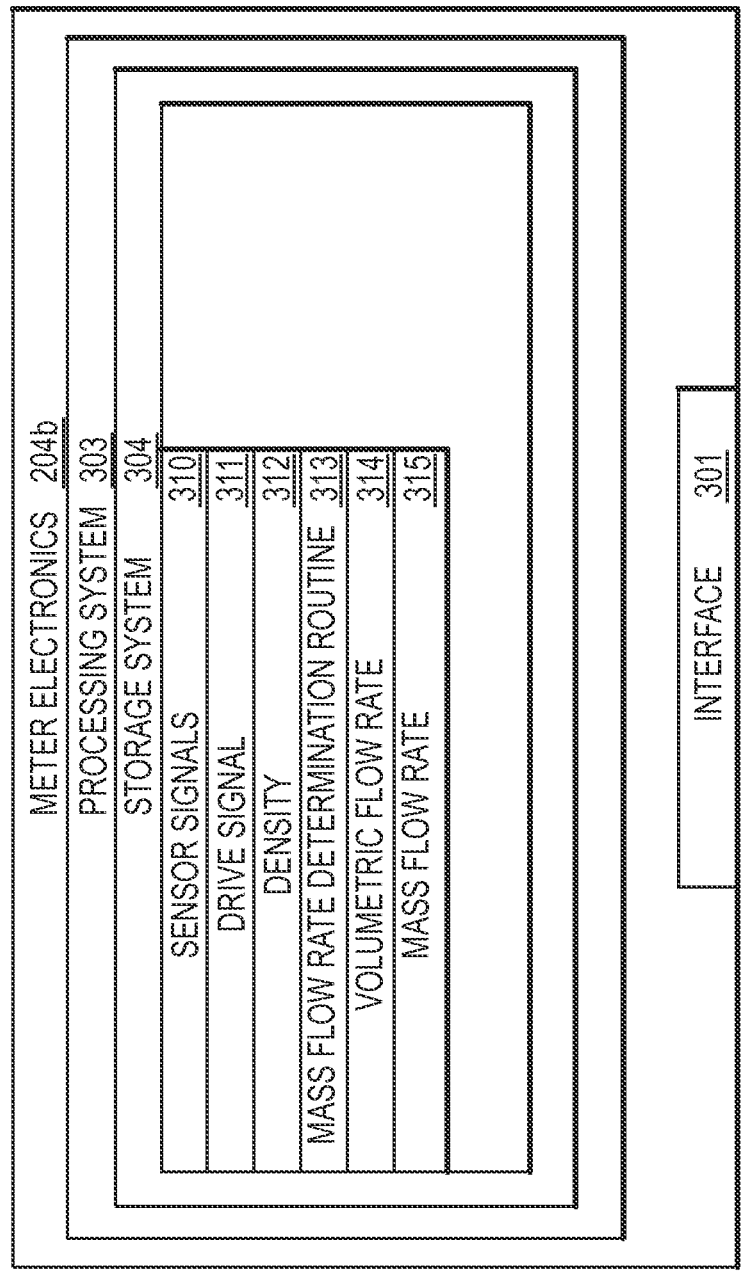
FIG. 3 shows a meter electronics according to an embodiment.
Figure 4:
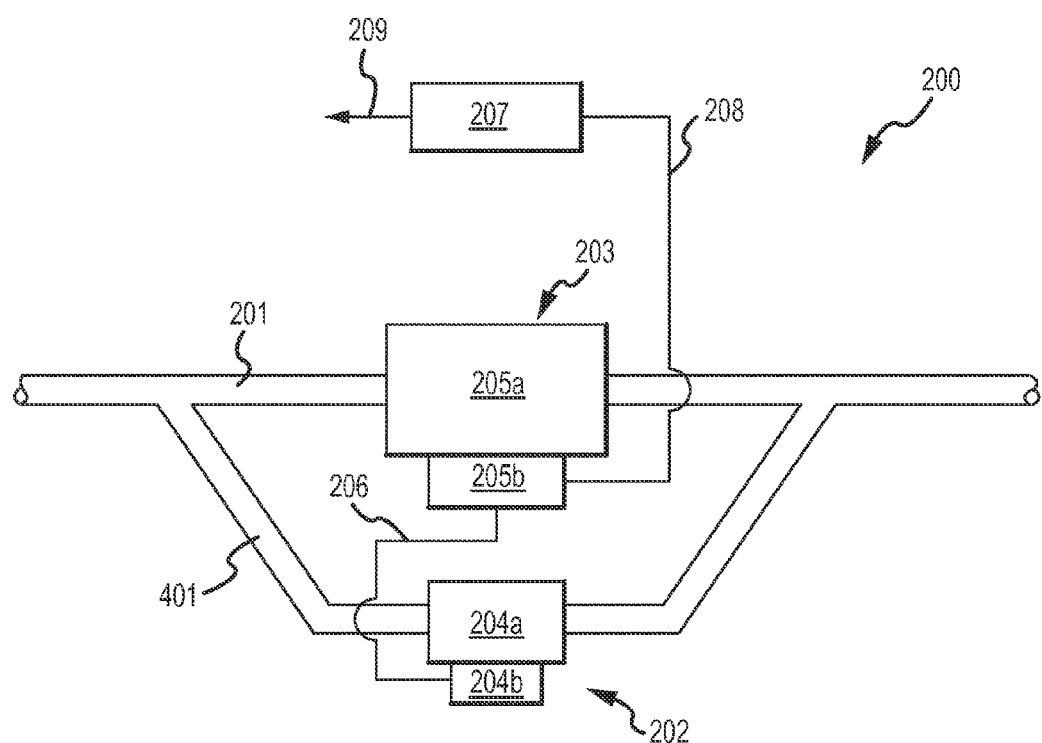
FIG. 4 shows the mass flow rate sensor system according to another embodiment.

FIGS. 2-4 and the following description depict specific examples to teach those skilled in the art how to make and use the best mode of embodiments of a mass flow rate system. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the mass flow rate system. As a result, the embodiments described below are not limited to the specific examples described below, but only by the claims and their equivalents.

FIG. 2 shows a mass flow rate sensor system 200 according to an embodiment. According to an embodiment, the mass flow rate sensor system 200 can be positioned within a flow conduit 201 receiving a process fluid or some other type of flow stream. The mass flow rate sensor system 200 can include a density meter 202 and a volumetric flow meter 203. The density meter 202 may comprise any well-known density meter, such as a Coriolis density meter, a hygrometer, an x-ray densitometer, a gamma densitometer, etc. The particular type of density meter may depend upon the particular application and should in no way limit the scope of the present embodiment. The volumetric flow meter 203 may comprise any well-known meter that measures a volumetric flow rate, such as an ultra-sonic meter, a magnetic meter, a turbine meter, a vortex meter, etc. According to an embodiment, the density meter 202 and the volumetric flow meter 203 can be placed in series in line with the conduit 201. In the embodiment shown, the density meter 202 is positioned upstream from the volumetric flow meter 203; however, in other embodiments, the order can be reversed.

In alternative embodiments, the density meter 202 can be placed in a slip stream, which branches off from the conduit 201 (See FIG. 4).

According to an embodiment, the density meter 202 comprises a sensor assembly 204a, which receives the flowing fluid. The density meter 202 further comprises a density meter electronics 204b. Although the density meter electronics 204b is shown as being physically coupled to the sensor assembly 204a, in other embodiments, the two components may simply be electrically coupled via an electrical lead. In either situation, the sensor assembly 204a is in electrical communication with the density meter electronics 204b via an electrical lead (not shown).

According to an embodiment, the density meter electronics 204b can receive sensor signals from the sensor assembly 204a. The density meter electronics 204b can process the received sensor signals to generate a measured density of the fluid flowing through the conduit 201 as is generally known in the art.

According to an embodiment, the volumetric flow meter 203 comprises a sensor assembly 205a, which receives the process fluid in the fluid conduit 201. The volumetric flow meter 203 further comprises a volumetric meter electronics 205b. In a manner similar to the density meter 202, while the volumetric meter electronics 205b as being is shown physically coupled to the sensor assembly 205a, in other embodiments, the two components may simply be coupled via an electrical lead. In either situation, the sensor assembly 205a is in electrical communication with the volumetric meter electronics 205b via an electrical lead (not shown).

According to an embodiment, the volumetric meter electronics 205b can receive signals from the sensor assembly 205a. The volumetric meter electronics 205b can process the signals and generate a volumetric flow rate as is generally known in the art.

According to an embodiment, the two meter electronics 204b, 205b are in electrical communication with one another via the electrical lead 206. The electrical communication between the two meter electronics 204b, 205b allows the generated measurement from one of the meter electronics to be communicated to the other meter electronics. For example, in the configuration shown, the density meter electronics 204b can receive the generated volumetric flow rate from the volumetric meter electronics 205b. With the volumetric flow rate received from the volumetric flow meter 203 along with the generated density, the density meter 202 can generate a mass flow rate using equation (1). According to an embodiment, the generated mass flow rate can then be output to a remote processing system 207 via electrical lead 208. According to an embodiment, the electrical lead 208 can additionally provide power to the density meter 202 and the volumetric flow meter 203. In some embodiments, the remote processing system 207 may include a further output lead 209. The output lead 209 can provide communication with a further processing system, for example.

According to an embodiment, the remote processing system 207 may be located at a distance greater than the distance between the density meter 202 and the volumetric flow meter 203. However, according to another embodiment, the remote processing system 207 may be located in close proximity to the two meters 202, 203. For example, the remote processing system 207 may be located at the same distance or a shorter distance than the distance between the density meter 202 and the volumetric flow meter 203. The particular location of the remote processing system 207 with respect to the meters 202, 203 should in no way limit the scope of the present embodiment and will depend upon the particular application.

The remote processing system 207 can comprise a general-purpose computer, a micro-processing system, a logic circuit, or some other general purpose or customized processing device. The remote processing system 207 can be distributed among multiple processing devices. The remote processing system 207 can include any manner of integral or independent electronic storage medium.

Figure 1:
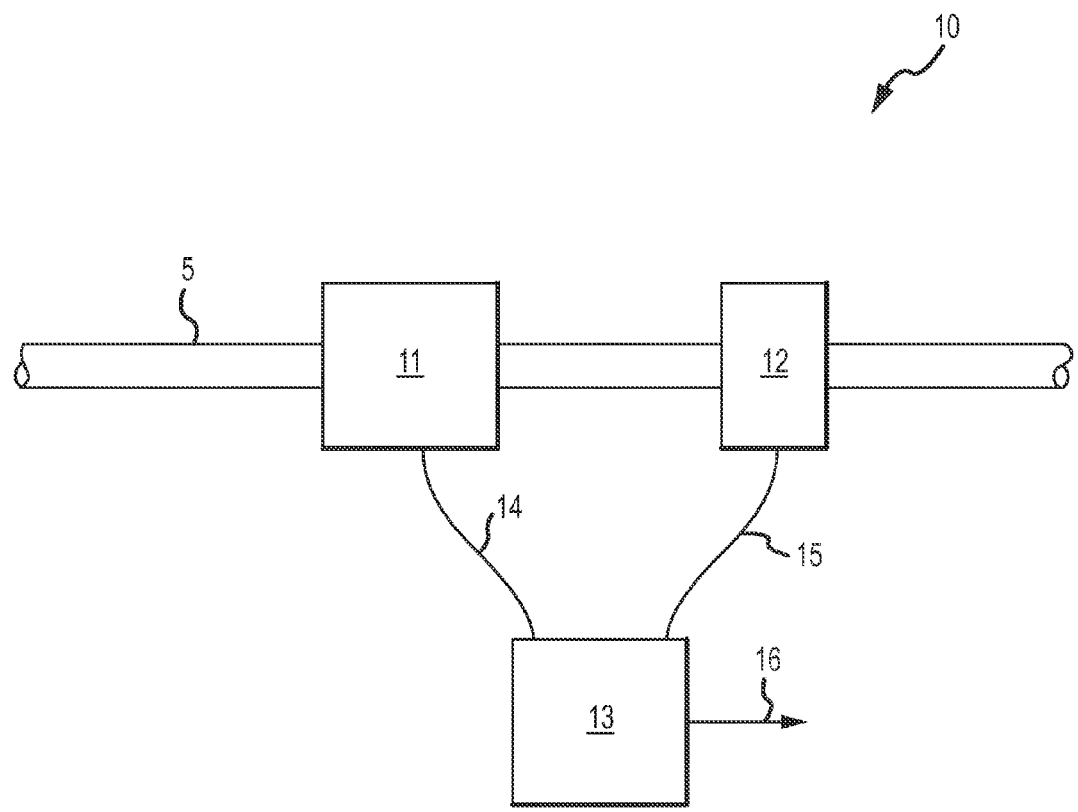
FIG. 1 shows a prior art mass flow rate system.

As can be appreciated, only one of the density meter 202 or the volumetric flow meter 203 is in direct electrical communication with the remote processing system 207. Although in the embodiment shown in FIG. 2, the density meter 202 is in direct electrical communication with the remote processing system 207, in other embodiments, the volumetric flow meter 203 can be in direct electrical communication with the remote processing system 207 instead. In either situation, the amount of wiring required is substantially reduced compared to the prior art system shown in FIG. 1. Additionally, the meter electronics that is electrically coupled with the remote processing system 207, outputs a mass flow rate. Therefore, the remote processing system 207 does not have to be specially configured to calculate a mass flow rate from a density and a volumetric flow rate.

FIG. 3 shows the density meter electronics 204b according to an embodiment of the invention. It should be appreciated that many of the features of the density meter electronics 204b can also be found in the volumetric meter electronics 205b of the volumetric flow meter 203. However, a description of the volumetric meter electronics 205b is omitted for brevity of the description. The density meter electronics 204b can include an interface 301 and a processing system 303. The processing system 303 may include a storage system 304. The storage system 304 may comprise an internal memory as shown, or alternatively, may comprise an external memory. The density meter electronics 204b can generate a drive signal 311 and supply the drive signal 311 to a driver (not shown) of the sensor assembly 204a. The density meter electronics 204b can also receive sensor signals 310 from the sensor assembly 204a. The density meter electronics 204b can process the sensor signals 310 in order to obtain a density 312 of the material flowing through the conduit 201. The density 312 can be stored for later use.

In addition to the sensor signals 310 received from the sensor assembly 204a, the interface 301 can also receive a generated volumetric flow rate 314 from the volumetric meter electronics 205b. The interface 301 may perform any necessary or desired signal conditioning, such as any manner of formatting, amplification, buffering, etc. Alternatively, some or all of the signal conditioning can be performed in the processing system 303. In addition, the interface 301 can enable communications between the density meter electronics 204b and the remote processing system 207. The interface 301 can be capable of any manner of electronic, optical, or wireless communication.

The interface 301 in one embodiment can include a digitizer (not shown); wherein the sensor signals 310 comprise analog sensor signals. The digitizer can sample and digitize the analog sensor signals and produce digital sensor signals. The digitizer can also perform any needed decimation, wherein the digital sensor signal is decimated in order to reduce the amount of signal processing needed and to reduce the processing time.

The processing system 303 can conduct operations of the density meter electronics 204b. The processing system 303 can execute the data processing required to implement one or more processing routines, such as the mass flow rate determination routine 313. The mass flow determination routine 313 can use equation (1) along with the generated density 312 and the received volumetric flow rate 314 to generate a mass flow rate 315. As discussed above, the mass flow rate 315 can then be output to the external remote processing system 207. In some embodiments, the processing system 300 may additionally output the density 312 and/or the volumetric flow rate 314.

It should be understood that the meter electronics 220 may include various other components and functions that are generally known in the art. These additional features are omitted from the description and the figures for the purpose of brevity. Therefore, the present invention should not be limited to the specific embodiments shown and discussed.

FIG. 4 shows the mass flow sensor system 200 according to another embodiment. In the embodiment shown in FIG. 4, the sensor assembly 204a of the density meter 202 is located within a slip stream 401, which branches off from the main conduit 201. The slip stream 401 is generally smaller than the conduit 201 such that only a small amount of the fluid flows into the slip stream 401. Although the volumetric flow meter 203 is positioned between the first and second ends of the slip stream 401 in the embodiment shown in FIG. 4, the volumetric flow meter 203 could be positioned at other areas of the conduit 201. For example, in some embodiments, the volumetric flow meter 203 is positioned just outside the ends of the slip stream 401 such that all of the fluid flows through the volumetric flow meter 203 rather than a portion of the fluid bypassing the volumetric flow meter 203. Therefore, a correction does not have to be performed to account for the amount of fluid bypassing the volumetric flow meter 203. However, in many embodiments, the volumetric flow meter 203 will be positioned close to the slip stream 401 so that the volumetric flow meter 203 and the density meter 202 are measuring substantially the same fluid at any given time.

According to the embodiment shown in FIG. 4, the sensor assembly 204a can receive a small portion of the fluid flowing through the system 200. This may be advantageous in some embodiments as the sensor assembly 204a can be made substantially smaller than in the embodiment shown in FIG. 2 as a smaller flow rate is being received by the density meter 202 in FIG. 4. Therefore, if the density meter 202 is formed from high cost materials, such as a tube made from titanium or tantalum, the cost of the sensor assembly 204a can be reduced due to the reduced size.

According to the embodiment shown in FIG. 4, the two meter electronics 204b, 205b are still in electrical communication with one another so that only one of the meter electronics 204b or 205b needs to be in direct electrical communication with the remote processing system 207. In the embodiment shown in FIG. 4, the volumetric meter electronics 205b is in direct electrical communication with the remote processing system 207 rather than the density meter 202. As can be appreciated, in this embodiment, the volumetric meter electronics 205b will be configured to receive the density measurement from the density meter electronics 204b and generate the mass flow rate based on the received density 312 and the generated volumetric flow rate 314.

In use, the mass flow rate sensor system 200 may be used to generate a mass flow rate based on individually determined volumetric flow rates and densities generated from two separate sensor assemblies 204a, 205a. According to an embodiment, the density meter 202 can generate a density measurement 312, as the process fluid flows through the conduit 201. According to an embodiment, substantially simultaneously, the volumetric flow meter 203 can generate a volumetric flow rate 314. According to another embodiment, the density meter 202 may generate an average density measurement. For example, the meter electronics 204b may store and keep a rolling average density determined from previous density measurements. The previous density measurements may be based on a predetermined number of previously received sensor signals 310, for example.

According to an embodiment, at least one of the meter electronics 204b, 205b can receive the fluid measurement from the other meter electronics. For example, in the embodiment shown in FIG. 2, the density meter electronics 204b can receive the volumetric flow rate 314 from the volumetric meter electronics 205b. Conversely, in the embodiment shown in FIG. 3, the volumetric meter electronics 205b can receive the density measurement 312 from the density meter electronics 204b. Preferably, the meter electronics that receives the fluid measurement is the meter electronics that is in direct electrical communication with the remote processing system 207. However, the present embodiment should not be so limited. For example, in FIG. 2, the density meter 202 is in direct electrical communication with the remote processing system 207. In some embodiments, the volumetric meter electronics 205b may receive the density measurement from the density meter 202. In yet another embodiment, each of the meter electronics 204b, 205b may send the generated measurement to the other meter electronics such that each of the meter electronics 204b, 205b includes both a density measurement and a volumetric flow rate measurement.

According to an embodiment, once one of the meter electronics includes both the density measurement 312 and the volumetric flow rate 314, the meter electronics can process the two measurements to generate a mass flow rate 315. The generated mass flow rate 315 can then be sent to the remote processing system 207 via the lead 208. If the meter electronics that generates the mass flow rate is not in direct electrical communication with the remote processing system 207, the generated mass flow rate can be sent to the meter electronics that is in direct electrical communication with the remote processing system 207 and subsequently pass the mass flow rate 315 on to the remote processing system 207.

Therefore, as can be appreciated, the remote processing system 207 can receive a mass flow rate from a combination of density meter 202 and volumetric flow meter 203 without having to separately perform the mass flow rate calculation. This advantageously simplifies the processing required of the remote processing system 207 as well as substantially reduces the amount of wiring required. Additionally, if either of the meters 202, 203 need to be replaced, the remote processing system 207 does not have to be reconfigured.

According to an embodiment, if both of the meter electronics 204b, 205b includes the density measurement and the volumetric flow rate measurement, both of the meter electronics 204b, 205b may generate a mass flow rate measurement. This allows either of the meter electronics 204b, 205b to send the mass flow rate measurement to the remote processing system 207. Further, in the event that one of the meters 202, 203 needs to be replaced, the remaining meter can easily provide the mass flow measurement to the remote processing system 207.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other mass flow systems, and not just to the embodiments described above and shown in the accompanying figures. Accordingly, the scope of the embodiments described above should be determined from the following claims.

We claim:

1. A mass flow rate sensor system (200), comprising:
a density meter (202) including a sensor assembly (204a) and a density meter electronics (204b) configured to generate a density measurement of a process fluid;
a volumetric flow meter (203) including a sensor assembly (205a) and a volumetric meter electronics (205b) configured to generate a volumetric flow rate of the process fluid and in electrical communication with the density meter electronics (204b); and
a remote processing system (207) in electrical communication with only one of the density meter electronics (204b) and the volumetric meter electronics (205b) and configured to receive a mass flow rate measurement of the process fluid generated by the density meter electronics (204b) or the volumetric meter electronics (205b) based on the generated density measurement and the generated volumetric flow rate.

2. The mass flow rate sensor system (200) of claim 1, wherein the sensor assembly (204a) of the density meter (202) and the sensor assembly (205a) of the volumetric flow meter (203) are located in line with a fluid conduit (201) carrying the process fluid.

3. The mass flow rate sensor system (200) of claim 1, wherein the sensor assembly (205a) of the volumetric flow meter (203) is located in line with a fluid conduit (201) carrying the process fluid and the sensor assembly (204a) of the density meter (202) is located in a slip stream (401) coupled to the fluid conduit (201) to receive a portion of the process fluid.

4. The mass flow rate sensor system (200) of claim 1, wherein the density measurement and the volumetric flow rate are generated substantially simultaneously.

5. The mass flow rate sensor system (200) of claim 1, wherein the density measurement comprises an average density.

6. The mass flow rate sensor system (200) of claim 1, wherein the density measurement comprises a rolling average determined from a predetermined number of previously received sensors signals.

7. A method for generating a mass flow rate measurement of a process fluid in a fluid conduit, comprising steps of:
determining a density of the process fluid with a density meter including a sensor assembly in fluid communication with the process fluid and a density meter electronics;
determining a volumetric flow rate of the process fluid with a volumetric flow meter including a sensor assembly in fluid communication with the process fluid and a volumetric meter electronics;
providing electrical communication between the density meter electronics and the volumetric meter electronics;
using at least one of the density meter electronics and the volumetric meter electronics to determine a mass flow rate of the process fluid based on the determined density and the determined volumetric flow rate; and
providing the mass flow rate to a remote processing system in electrical communication with only one of the density meter electronics and the volumetric meter electronics.

8. The method of claim 7, wherein the sensor assembly of the density meter and the sensor assembly of the volumetric flow meter are located in line with the fluid conduit carrying the process fluid.

9. The method of claim 7, wherein the sensor assembly of the volumetric flow meter is located in line with the fluid conduit carrying the process fluid and the sensor assembly of the density meter is located in a slip stream coupled to the fluid conduit to receive a portion of the process fluid.

10. The method of claim 7, wherein the density measurement and the volumetric flow rate are determined substantially simultaneously.

11. The method of claim 7, wherein the density measurement comprises an average density.

12. The method of claim 7, wherein the density measurement comprises a rolling average determined from a predetermined number of previously received sensors signals.

* * * * *